United States Patent [19]

Ramond

[11] 4,015,854
[45] Apr. 5, 1977

[54] FRAME FOR VARIOUS CYCLES

[76] Inventor: Louis Maurice Ramond, 28, rue de la Baume, Saint-Etienne, France

[22] Filed: Mar. 25, 1975

[21] Appl. No.: 561,834

[30] Foreign Application Priority Data

Mar. 29, 1974 France .......................... 74.12210

[52] U.S. Cl. .................. 280/281 R; 280/152.1; 280/274
[51] Int. Cl.² .................................. B62L 3/04
[58] Field of Search ............. 280/281 R, 288, 274, 280/284, 152.1, 152.2, 152.3; 188/24

[56] References Cited

UNITED STATES PATENTS

| | | | |
|---|---|---|---|
| 603,006 | 4/1898 | Demarest | 280/274 |
| 2,330,560 | 9/1943 | Descos | 280/288 X |
| 2,370,726 | 3/1945 | Hess | 280/281 |
| 2,378,961 | 6/1945 | Wallace | 280/281 |
| 2,493,037 | 1/1950 | Simon | 280/281 |
| 3,508,765 | 4/1970 | Bauer | 280/281 |
| 3,833,242 | 9/1974 | Thompson | 280/281 R |
| D23,395 | 6/1894 | Stark | D12/111 |

FOREIGN PATENTS OR APPLICATIONS

| | | | |
|---|---|---|---|
| 979,506 | 4/1951 | France | 280/281 |
| 978,252 | 4/1951 | France | 280/279 |
| 1,368,941 | 6/1964 | France | |
| 785,097 | 8/1935 | France | |
| 874,371 | 8/1942 | France | |
| 329,046 | 5/1930 | United Kingdom | 280/281 |

*Primary Examiner*—Joseph F. Peters, Jr.
*Assistant Examiner*—John P. Silverstrim
*Attorney, Agent, or Firm*—Brooks Haidt Haffner & Delahunty

[57] ABSTRACT

A unitary molded or cast bicycle frame formed by a plurality of elements of open cross-section and integral with each other to form a unitary structure, such elements including a top crossbar, a steering tube at one end, the front end, of the crossbar, a transverse crank gear case below and spaced downwardly from the top crossbar, a bottom member extending from the steering tube to the crank gear case, a two-armed, wheel receiving fork extending rearwardly from the crank gear case and having wheel spindle receiving openings at the rearward ends of the arms, a pair of struts extending from the arms of said fork adjacent said openings to the opposite, rear end of the top crossbar and a strut member extending from said struts at portions thereof intermediate said top crossbar and said openings to the arms of said fork adjacent said crank gear case. A saddle or seat tube or opening is provided at or adjacent the juncture of the struts and the top crossbar.

8 Claims, 10 Drawing Figures

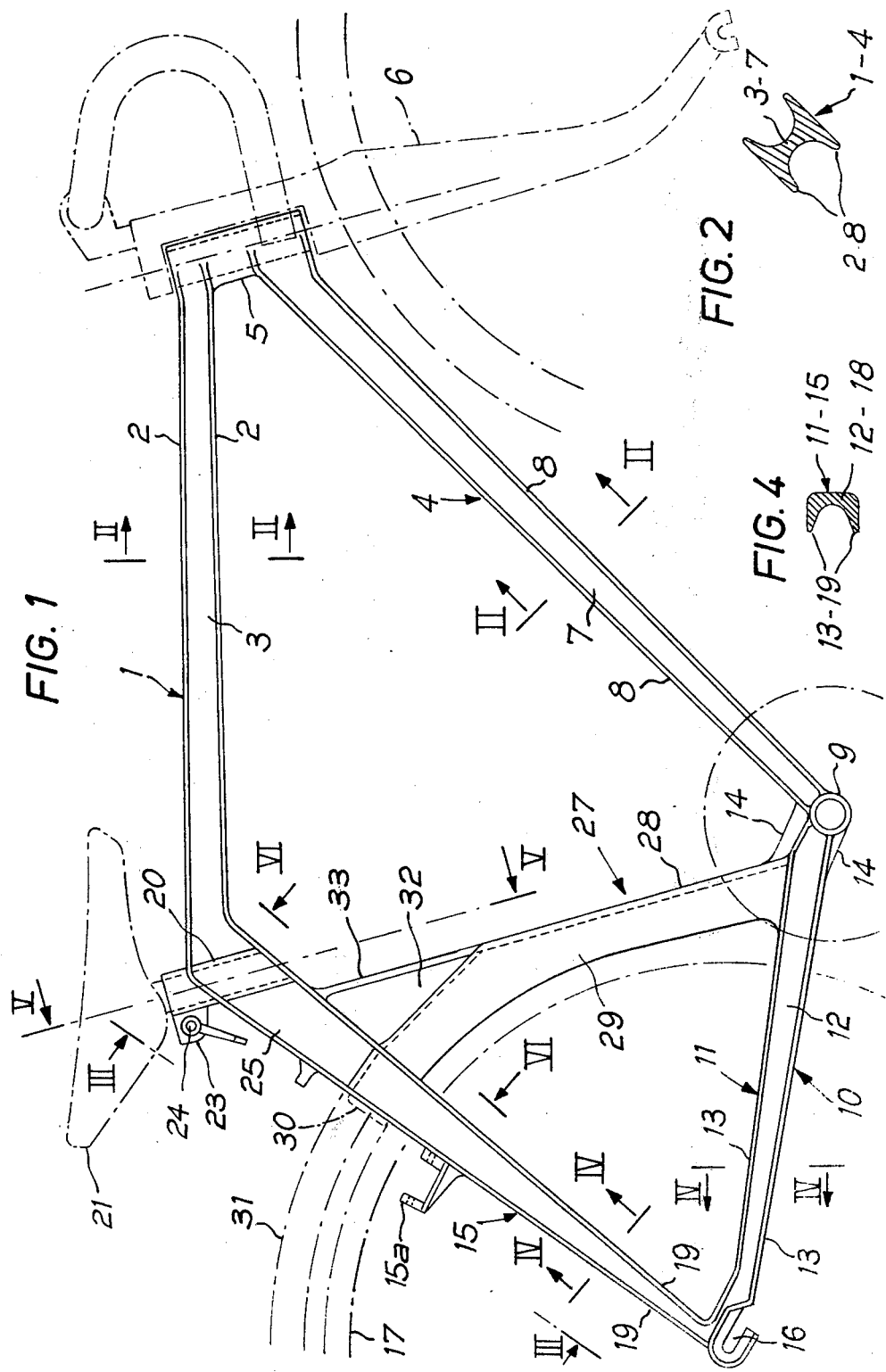

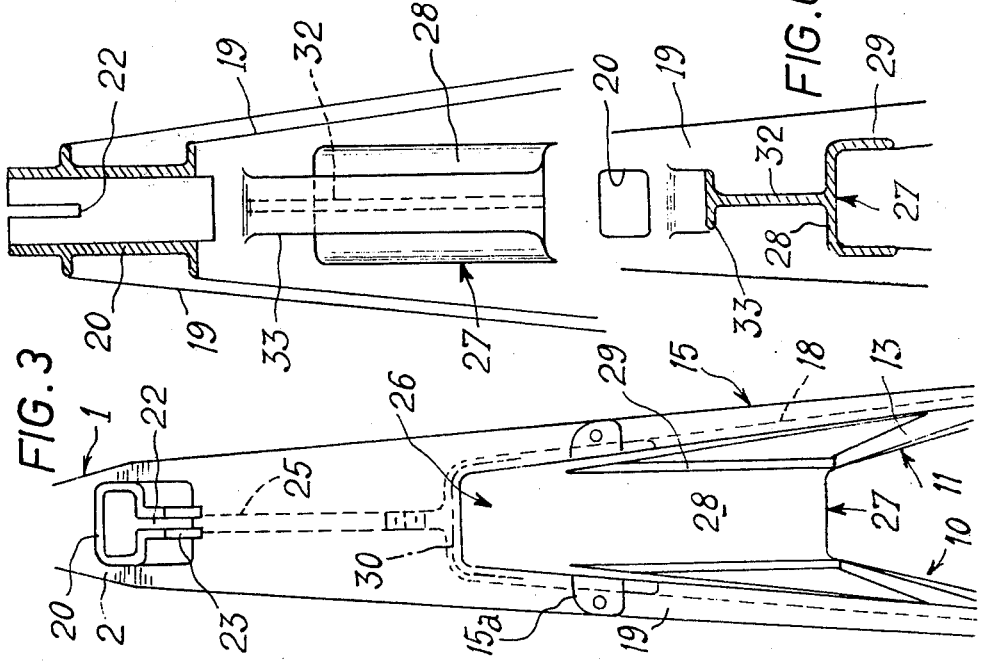

FRAME FOR VARIOUS CYCLES

This invention relates to a frame for various cycles, more particularly for bicycles having a novel structure comprising constituent elements forming novel duties.

The invention is particularly suitable for production by moulding or casting in metal or plastics.

According to the invention, there is provided a bicycle frame comprising a plurality of open section elements connected to form a unitary structure, the elements including a top cross-bar, a bottom member connected to the top crossbar by a steering tube and to a transverse crank gear case, a rear fork extending from the crank gear case to a wheel spindle receiving bearings, stays or struts extending from the top cross bar to the wheel spindle receiving bearings and a tie or strut member connecting the stays or struts to the rear fork at position spaced from the wheel spindle receiving bearings.

The invention will now be described in greater detail, by way of example, with reference to the drawings, in which:

FIG. 1 is a view in elevation of a frame according to the invention;

FIG. 2 is a cross-section to an enlarged scale on any pair of lines 11—11 of FIG. 1;

FIG. 3 is a partial view to an enlarged scale on the line 111—111 of FIG. 1;

FIG. 4 is a cross-section to an enlarged scale on either of the two pairs of lines IV—IV of FIG. 1;

FIGS. 5 and 6 are partial sections to an enlarged scale on the lines V—V and V1—VI respectively of FIG. 1;

FIG. 7 is a partial section, in elevation, of another embodiment of the invention;

Figure 10:
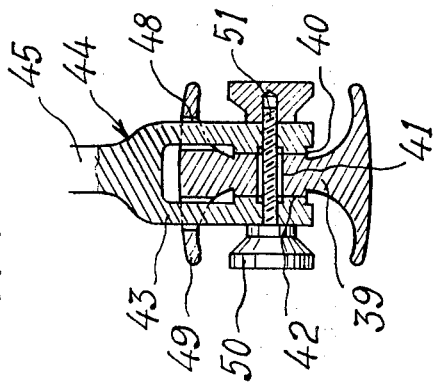
FIG. 10 is a cross-section on the line X—X of FIG. 9.

FIG. 1 shows the frame according to the invention, made entirely by moulding or casting either of an appropriate plastics, e.g. glass fibre reinforced polycarbonate or polyamide or polyester, or possibly of metal. The frame comprises a top or crossbar element 1 in the form of an I-section member having two flanges 2 which, when the frame is in its normal position of use, extend substantially horizontally. Also, the arms 2 are of a width very similar to the average height of a web 3 interconnecting them. FIG. 1 shows that, preferably, web height increases slightly from the front of the frame.

Crossbar 1 is connected to a bottom element 4 by a steering box or tube 5 which extends in a direction making an angle of substantially 15° relatively to the perpendicular to the crossbar 1 as applied to the plane of the drawings. Tube 5 is adapted to bear a front steering fork 9 which is shown in chain-dotted lines and which can either be conventional or which can also be embodied by a moulding or casting of a material which is similar to or the same as the material used for the frame.

The bottom element 4 is formed by an I-section member of similar dimensions to the crossbar 1, as can be gathered from FIG. 2. Element 4 makes an angle of substantially 45° with the crossbar 1 and, unlike the latter, has a web 7 whose height decreases gradually from the steering tube 5. The web 7 and the flanges 8 of the element 4 carry, at the end remote from the tube 5, a crank gear case 9 beyond which a fork 10 extends, making an angle of substantially 150° with the general direction of the element 4. The rear fork 10 has two branches 11 embodied by two channel members which are of the cross-section visible in FIG. 4 and whose webs 12 face one another. The flanges 13 and webs 12 of the branches 11 decrease in height progressively from the case 9, to which the flanges 13 are connected by ribs 14. The branches 11 extend in two slightly divergent directions as far as the terminal parts of two struts, stays 15 or the like rigidly secured to crossbar 1. The ends of the branches 11 and of the stays 15 or the like together form two open bearings 16 adapted to receive the terminal parts of the spindle of a rear wheel 17 shown in FIG. 1 in chain-dotted lines.

The stays 15 or the like are formed by two channel section members which are of the shape shown in FIG. 4 and whose webs 18 are disposed opposite one another, the members 15 extending in two convergent directions from the open bearings 16. Each member 15 has a web 18 whose height increases progressively from the open bearings 16 so that the flanges 19 are connected to the flanges 2 of the crossbar 1 at a bend corresponding substantially to the position of a tubular element 20 adapted to receive and retain a rod supporting a saddle 21 (shown in chain lines). As can be seen from FIGS. 3 and 6, the tubular element 20 is preferably of polygonal cross-section and is formed, in its part projecting beyond the top arms 2, 19 of the members 1 and 15, with an axial slot 22 bounded by two portions 23 and adapted to have any appropriate kind of clamping element 24 extending through them.

FIGS. 1 and 3 show that the stays 15 are also so shaped that their webs 18 merge into a common web 25 to bound a wheel passage 26, beyond which passage the arms 19 continue as common arms joined together by the web 25 as far as the tubular element 20.

The four sided figure formed by the integers 1, 4, 10 and 15 also comprises a transverse element 27 forming a strut offset towards the bearings 16 relative to the imaginery alignment axis between the tubular element 20 and the case 9. Element 27 is formed by a channel section member 28 whose flanges 29 are connected to the flanges 13, 19 of the branches 11 and of the stays 15 in the manner shown in FIGS. 1, 3, 5 and 6. Between the flanges 29, the member 28 has a width corresponding substantially to the local cross-section of the wheel passage between the facing webs 12 and 18 of the branches 11 and of the stays 15, and therefore also forms a stiffening stay or strut or the like for the frame and a partial mudguard extending around that part of the periphery of the wheel 17 which is disposed between the stays 15 and the fork 10. So that the mudguard protecting the rear wheel 17 can, if desired, be completed as an extension of the member 28, the stay outer flanges 19 form, where they bound the wheel passage and near the plane where the arms 18 are joined together, a shouldered or stepped edge or flange 30 or the like making it possible to have a releasable snap-on or similar attachment of a half-mudguard 31 of the kind shown in chain-dotted lines in FIG. 1. As can also be seen from FIG. 1, each stay 15 can have a projecting bracket 15a bounding support and pivot bearings for a brake caliper.

As FIG. 1 shows, the strut 27 can be formed by a section member whose web can be straight, broken or curved. In the two latter cases the section member 28 is preferably connected to the bottom arm of the common section of the stays 15, in the part corresponding to the web 25, by a strengthening gusset 32 supplemented by a transverse partition 33 extending substantially as an extension of that part of the web of the member 28 which rises from the fork 10.

As is apparent from the foregoing, the frame according to the invention resembles in appearance a four sided figure having a shaped open cross-section. In addition to the considerable advantage of the weight saving resulting from using such a construction and by the fact that it can be formed in an appropriate plastics, it can be coloured throughout the material or may be translucent or transparent to give the frame according to the invention a completely new and lasting aesthetic appearance as compared with conventional constructions.

Another feature of the frame according to the invention is that it has a transverse strengthening element offset from the plane of alignment between the tubular element 20 and the crank gear case 9; consequently, the transverse element 27 can be devised to perform the extra duty of a protective mudguard for the corresponding segment of the rear wheel fitted in the frame. This feature also shows that the tubular element 20 is disociated from the transverse element 27 and is an independent moulding increasing the mechanical strength of the frame bend at the junction between the crossbar 1 and the common section or portion of the stays or struts 15 or the like.

FIG. 7 shows another embodiment wherein the various features hereinbefore described are used for a folding bicycle frame comprising a front half-frame 34 and a rear half-frame 35 interconnected by a joint 36. In such a case, the cross-bar 1a of the front half-frame 34 corresponds to the complementary sectional portion 1b of the rear half-frame 35. Portion 1b is connected to the common portion of the struts 15 by way of the strengthening gusset 32 of the transverse element 27 which, as in the embodiment previously described, is embodied by a section member 28. In such a case the crossbar portion 1b is connected to the crank gear case 9 by a vertical rib 37 carrying some of the parts of a joint 36 whose complementary elements are borne by a rib 38 connecting the crossbar portion 1a to the bottom member 4a.

Clearly, although the idea is not shown, a similar system can be used for a lady's bicycle frame of the non-folding kind, in which event the integers 1a, 1b, are a single unitary section member.

Figure 8:
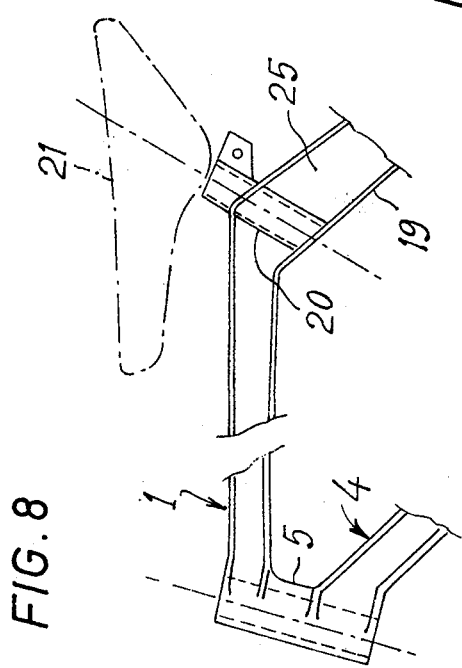
FIG. 8 is a partial side elevation similar to FIG. 1 of a constructional variant.

FIG. 8 shows that, since the transverse element 27 and the tubular element 20 are dissociated from one another, the tubular element 20 can have a relative orientation different from that of the tube 5; for instance, the element 20 can be more inclined to the perpendicular to the general direction of the crossbar 1 than the tube 5. Consequently, when the saddle 21 is raised by sliding in the tubular element 20 the saddle 20 simultaneously moves away from the tube 5, a feature which usually fits in with a morphological adjustment requirement for tall cyclists. This local shaping therefore makes it possible to obviate the use between the saddle frame and the support rod of a position adjustment slide movable along the front-to-rear axis.

Figure 9:
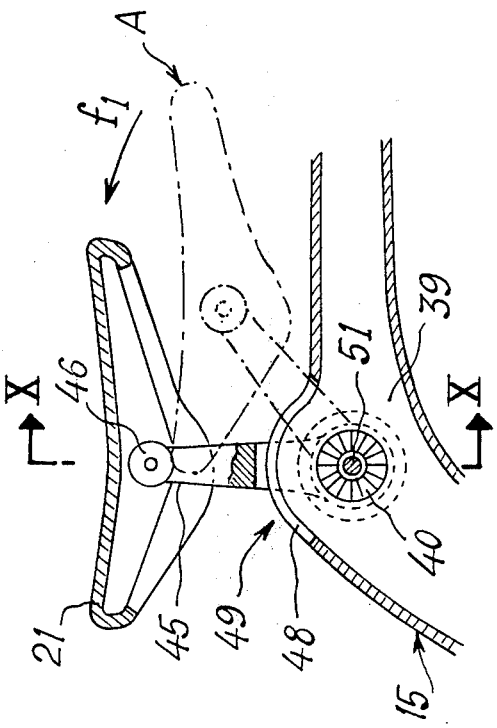
FIG. 9 is a view in side elevation showing a constructional variant of the subject matter of FIG. 8.

FIGS. 9 and 10 show that because of the special construction of the frame, vertical adjustment of the saddle 21 and adjustment of its distance from the tube 5 can be provided by means other than those described with reference to FIG. 3. In the variant of FIGS. 9 and 10, the crossbar 1 and the common portion of the stays or struts 15 cooperate to bound at the bend a shaped section member having a web 39 which is locally of increased height. Projecting from its opposite two surfaces, the web 29 has two radially notched or toothed annular regions 40 devised concentrically of a central aperture 41. The regions 40 are adapted to cooperate with two regions 42 which are notched or toothed radially in complementary manner and which are formed on the opposite surfaces of the arms of cheeks 43 of a yoke 44 formed at the end of an arm 45 e.g. of plastics. Arm 45 has a head 46 having provision for the support and angular orientation of a saddle 21. The integers 43 are engaged in slots 48 in top arm 49 of web 39 to which the arms or cheeks 43 are secured e.g. through the agency of one or two knobs 50 screwed to a screwthreaded rod 51 which extends through the cheeks 43 and the web 39.

Consequently, from the end position A shown in chain-dotted lines in FIG. 9, at least one of the knobs 50 can be slackened so that the arm 45 can be pivoted in the direction indicated by an arrow $f_1$ through a maximum angular amplitude determined by the length of the slots 48. This feature provides vertical adjustment of saddle 21 simultaneously with its movement away from tube 5. The saddle 21, once locked in the required new position, can be returned to its original orientation by means of the mounting facilities interposed between the saddle and the head 46.

The invention is not limited to the embodiments which are shown and which have been described in detail since they can be modified in various ways without departure from the scope of the invention. More particularly, the cross section of the crossbar 1 and bottom element 4 can be varied if each of them has e.g. a channel-section segment extending from the tube 5 to increase torsional strength.

What we claim is:

1. A bicycle frame formed by a plurality of elements integral with each other to form a structurally continuous and homogeneous, unitary structure without inhomogeneous joints including welds, said elements including a top crossbar, a steering tube at the front end of said crossbar, a transverse crank gear case below and spaced downwardly from said crossbar, a bottom member extending from said steering tube to said crank gear case, a wheel receiving fork having two arms extending rearwardly from said crank gear case and having wheel spindle receiving openings at the rearward ends of said arms, a pair of struts extending from said arms of said fork, adjacent said openings, to the opposite, rear end of said crossbar and a rigid strut member extending from said struts at portions thereof intermediate said top crossbar and said openings to said arms of said fork adjacent said crank gear case, said crossbar, said bottom member, said two arms, said struts and said strut member each having an open cross-section which has at least one open side, said crossbar and said bottom member lying substantially in a plane, each of said crossbar, said bottom member, said two arms and said struts being disposed with said open side thereof facing away from said plane, and said strut member having a portion which extends from adjacent said crank gear case to a portion of said struts spaced from said rear end of said crossbar, having a partition extending transversely to said plane and from intermediate the ends of said portion of said strut member to adjacent said rear end of said crossbar and having a strengthening member intermediate and joined to said partition and said last-mentioned portion whereby said strut member acts as a stiffening member between said struts, and said arms to prevent movement of the upper ends of said struts toward said crank gear case.

2. A bicycle frame according to claim 1, wherein the vertical dimension of said crossbar increases in the direction from the front end to the rear end thereof, said bottom member, in the direction from said steering tube to said crank gear case decreases in dimension transverse to said last-mentioned direction, said arms of said fork, in the direction from said openings to said crank gear case increase in dimension transverse to said last-mentioned direction, and said struts, in the direction from said openings to said crossbar, increase in dimension transverse to said last-mentioned direction.

3. A bicycle frame according to claim 1 further comprising integral projections extending upwardly from said struts for receiving spindles of a brake caliper and wherein the upper end of said strut member is stepped and extends rearwardly of said struts for receiving an end of a partial mudguard.

4. A bicycle frame according to claim 1, wherein the open cross-section of said crossbar and said bottom member is I-shaped, and the open cross-section of said arms, said struts and said strut member is U-shaped and said strut member is disposed with its open side thereof facing toward said openings to provide at least a partial mudguard for a wheel mounted between said arms.

5. A bicycle frame formed by a plurality of elements integral with each other to form a unitary structure, said elements including a top crossbar, a steering tube at the front end of said crossbar, a transverse crank gear case below and spaced downwardly from said crossbar, a bottom member extending from said steering tube to said crank gear case, a wheel receiving fork having two arms extending rearwardly from said crank gear case and having wheel spindle receiving openings at the rearward ends of said arms, a pair of struts extending from said arms of said fork, adjacent said openings, to the opposite, rear end of said crossbar, a rigid strut member extending from said struts at portions thereof intermediate said top crossbar and said openings to said arms of said fork adjacent said crank gear case, said strut member acting as a stiffening member between said struts and said arms to prevent movement of the latter toward each other, said crossbar, said bottom member, said two arms, said struts and said strut member each having an open cross-section which has at least one open side, said crossbar and said bottom member lying substantially in a plane, and each of said crossbar, said bottom member, said two arms and said struts being disposed with said open side thereof facing away from said plane, and joining means integral with and joining said struts and extending from the point of juncture of said strut member with said struts to said crossbar and a tubular element joined with said joining means and said struts at the junction of the latter with said crossbar for receiving a saddle mounting rod, said tubular element extending from the upper side of said struts to the lower side thereof and reinforcing said junction between said struts and said crossbar.

6. A bicycle frame according to claim 5, wherein the axis of said tube is substantially parallel to said plane and extends generally vertically.

7. A bicycle frame according to claim 6, wherein said axis of said tubular element extends at an angle to said axis of said steering tube, said angle being less than 90°.

8. A bicycle frame formed by a plurality of elements integral with each other to form a unitary structure, said elements including a top crossbar, a steering tube at the front end of said crossbar, a transverse crank gear case below and spaced downwardly from said crossbar, a bottom member extending from said steering tube to said crank gear case, a wheel receiving fork having two arms extending rearwardly from said crank gear case and having wheel spindle receiving openings at the rearward ends of said arms, a pair of struts extending from said arms of said fork, adjacent said openings, to the opposite, rear end of said crossbar, a strut member extending from said struts at portions thereof intermediate said top crossbar and said openings to said arms of said fork adjacent said crank gear case, said crossbar, said bottom member, said two arms, said struts and said strut member each having an open cross-section, said strut member being a channel member and being disposed with its open side facing toward said openings, the upper end of said channel member joining said struts at portions thereof spaced from said rear end of said crossbar, a transverse wall extending from said struts at portions thereof adjacent said crossbar to a portion of said strut member spaced from said struts and a reinforcing gusset intermediate and joining said strut member, said transverse wall and said struts.

* * * * *